United States Patent [19]

Gallucci et al.

[11] Patent Number: 4,806,597

[45] Date of Patent: Feb. 21, 1989

[54] COMPOSITION COMPRISING AROMATIC POLYCARBONATE, POLYOLEFIN, ETHYLENE VINYL ALCOHOL COPOLYMER, AND A MODIFIED HYDROGENATED ALKYLIDENE VINYL AROMATIC BLOCK COPOLYMER

[75] Inventors: Robert R. Gallucci, Mt. Vernon, Ind.; Dana C. Bookbinder, Pittsfield, Mass.

[73] Assignee: General Electric Company, Mt. Vernon, Ind.

[21] Appl. No.: 113,858

[22] Filed: Oct. 29, 1987

[51] Int. Cl.[4] ............................................. C08L 29/04
[52] U.S. Cl. ........................................ 525/57; 525/58
[58] Field of Search ................ 525/57, 58, 70, 67

[56] References Cited

U.S. PATENT DOCUMENTS 4,332,858  6/1982  Saitoh ................................. 428/412
4,587,295  5/1986  Giles et al. ........................... 525/57

FOREIGN PATENT DOCUMENTS 085115  8/1982  European Pat. Off. .

Primary Examiner—Theodore E. Pertilla
Attorney, Agent, or Firm—Martin B. Barancik

[57] ABSTRACT

A composition which comprises
a. an aromatic polycarbonate,
b. a polyolfefin,
c. an ethylene vinyl alcohol copolymer,
d. a hydrogenated alkylidene vinyl aromatic block copolymer graft modified with an unsaturated dicarboxylic acid or unsaturated dicarboxylic acid anhydride.

9 Claims, No Drawings

COMPOSITION COMPRISING AROMATIC POLYCARBONATE, POLYOLEFIN, ETHYLENE VINYL ALCOHOL COPOLYMER, AND A MODIFIED HYDROGENATED ALKYLIDENE VINYL AROMATIC BLOCK COPOLYMER

BACKGROUND OF THE INVENTION

Multilayer compositions have been useful for many years. The concept of a multilayer is that the positive properties of two or more materials are combined with the structural integrety of each material being essentially uncompromised. Usually the positive properties of one material are offset or counterbalanced to weaker properties of the second material. Although many of these multilayer compositions can be hypothesized on the basis of laminating a material possessing certain strong properties with the material having weaknesses in these same property areas, certain practical considerations inhibit successful implementation on this theory. Usually these practical considerations consist of the fact that these materials are incompatible with each other, that is, they do not adhere well to each other, thereby creating a structure which is relatively weak with respect to forces which would have a tendency to exert pressure at their juncture lines. A further complication relating to the use of multilayer compositions in various structures is that the present methods of preparing these structures such as bottles or multilayer trays in the food service industry leaves a substantial amount of scrap material. Many times the scrap material cannot be utilized in the actual structure layers since it imparts characteristics which would be detrimental to the application to which the structure has been identified. Therefore there exists a fertile field for applications of the blended scrap material from multilayer compositions.

It has now been found that the scrap blended material from multilayer compositions utilizing aromatic polycarbonate, polyolefin, and ethylene vinyl alcohol together with its tie layer of grafted hydrogenated styrene/ethylene butylene block copolymer tie layer can be successfully and advantageously made into a new blend. Such blends can also of course arise from the combination of these materials prior to any previous existence in a multilayer composition.

SUMMARY OF THE INVENTION

In accordance with the invention there is an admixture which comprises an aromatic polycarbonate, an ethylene vinyl alcohol copolymer, a polyolefin, and a hydrogenated alkyldiene vinyl aromatic block copolymer which is graft modified with an unsaturated dicarboxylic acid or unsaturated dicarboxylic acid anhydride.

The invention also encompasses the process of mixing a melt of each of the four polymers mentioned above with each other and the composition prepared from such process. Such process can be used for extruding the composition or molding it as well.

It is preferred to have the following weight proportions of the above-identified materials in the composition:

a. from about 20 to about 80 weight percent polycarbonate, b. from about 20 to about 80 weight percent polyolefin, c. from about 3 to about 15 weight percent ethylene vinyl alcohol copolymer, d. from about 3 to about 15 weight percent of hydrogenated alkydiene vinyl aromatic block copolymer which is graft modified with an unsaturated dicarboxylic acid or unsaturated dicarboxylic acid anhydride.

The composition of the invention yielded in tensile testing where the same admixtures wherein the hydrogenated alkylidene vinyl aromatic block copolymer is not grafted broke without yielding. Additionally there is substantially increased percent elongation with the compositions of the invention in comparison with the non-graft containing compositions.

The aromatic polycarbonate useful herein can generally be prepared by the reaction of at least one dihydric phenol and a carbonate precursor such as phosgene, a haloformate, or a carbonate ester. Generally speaking, such polycarbonate resins may be typified as being comprised of at least one recurring structural unit represented by the formula

wherein A is a divalent aromatic residue of the dihydric phenol employed in the polymer forming reaction. Preferably, the polycarbonate polymers used to provide the articles of the instant invention have an intrinsic viscosity (as measured in methylene chloride at 25° C.) ranging from about 0.3 to about 1.7 dl/gm. The dihydric phenols which may be employed to provide such aromatic carbonate polymers may be represented by the general formula

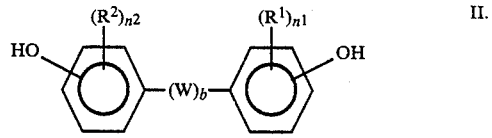

wherein:

$R^2$ is independently selected from halogen, monovalent hydrocarbon, monovalent hydrocarbonoxy, and monovalent hydrocarboncarboxy radicals.

$R^1$ is independently selected from halogen, monovalent hydrocarbon, and monovalent hydrocarbonoxy and hydrocarboncarboxy radicals;

W is selected from divalent hydrocarbon radicals, —S—, —S—S—, —O—,

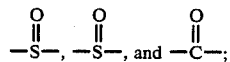

$n^2$ and $n^1$ are independently selected from integers having a value from 0 to 4 inclusive; and b is either zero or one.

The monovalent hydrocarbon radicals represented by $R^2$ and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by $R^2$ and $R^1$ are chlorine and bromine.

The divalent hydrocarbon radicals represented by W include the alkylene, alkylidene, cycloalkylene, and cycloalkylidene radicals. The preferred alkylene radicals are those which contain from 2 to about 30 carbon atoms. The preferred alkylidene radicals are those containing from 1 to about 20 carbon atoms. The preferred cycloalkylene and cycloalkylidene radicals are those containing from 6 to about 12 ring carbon atoms.

The monovalent hydrocarbonoxy radicals represented by $R^2$ and $R^1$ may be represented by the formula $-OR^3$ wherein $R^3$ is a monovalent hydrocarbon radical of the type described hereinafore for $R^2$ and $R^1$. Preferred monovalent hydrocarbonoxy radicals are the alkoxy and aryloxy radicals.

The monovalent hydrocarboncarboxy radicals represented by $R^2$ and $R^1$ may be represented by the formula

where $R^3$ is as described above. Preferred monovalent hydrocarboncarboxy radicals are acetoxy and benzoyl radicals.

Some illustrative non-limiting examples of the dihydric phenols falling within the scope of Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4'-dihydroxydiphenyl ether;
4,4'-thiodiphenol;
4,4'-dihydroxy-3,3'-dichlorodiphenyl ether; and
4,4'-dihydroxy-2,5-dimethyldiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

These aromatic polycarbonates can be manufactured by known processes, such as, for example and as mentioned above, by reacting a dihydric phenol with a carbonate precursor, such as phosgene, in accordance with methods as set forth in the above-cited literature and U.S. Pat. Nos. 4,018,750 and 4,123,436, incorporated herein by reference, or by transesterification processes such as disclosed in U.S. Pat. No. 3,153,008, incorporated by reference, as well as other processes known to those skilled in the art.

It is possible to employ two or more different dihydric phenols or a copolymer of a dihydric phenol with glycol or with a hydroxy or acid terminated polyester or with a dibasic acid in the event a carbonate copolymer or interpolymer rather than a homopolymer is desired for use in the preparation of the polycarbonate mixture of the invention. Branched polycarbonates are also useful, such as those described in U.S. Pat. No. 4,001,184, incorporated herein by reference. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a homopolymer derived from 2,2-bis(4-hydroxyphenyl)propane (bisphenol-A).

The second major component of the blend is a polyolefin. Typical of the polyolefins are polyethylene, polypropylene, polybutylene, polyisobutylene or any of the olefin monomers having from 2 to about 10 carbon atoms, preferably from 2 to about 8 carbon atoms. Copolymers of above may be employed and are included within the term polyolefin. Examples of copolymers include copolymers ethylene and propylene or ethylene and butene. The term copolymers includes the usual copolymers, that is, random, random block and block copolymers. The polyolefins used in this invention can be made by a variety of techniques resulting in a range of densities, i.e. high density polyethylene, low density polyethylene and linear low density polyethylene. The preferred polyolefin is polypropylene.

The third component of the blend is an ethylene vinyl alcohol copolymer. The ethylene vinyl alcohol copolymer is readily prepared from the well known ethylene vinyl acetate copolymers by hydrolysis. The ethylene vinyl alcohol copolymer generally has from about 10 to about 60 mole percent ethylene, preferably from about 20 to 50 mole percent ethylene. It is preferred that there be very little or no vinyl acetate left after hydrolysis, i.e. that all the vinyl acetate should be converted to the vinyl alcohol. Generally however no more than about 5 weight percent of vinyl acetate can still be present in the copolymer.

The fourth component of the blend composition is a block copolymer of a vinyl aromatic and an aliphatic diene which has been hydrogenated to remove a substantial quantity of the residue aliphatic unsaturation present after copolymerization. This block copolymer is grafted with an unsaturated dicarboxylic acid or acid anhydride molecule. The block copolymers are of the linear, sequential or radial teleblock composition. These polymers are well known in the art and are generally commercially available or may be readily prepared by known methods.

One of the blocks of these polymers comprise homopolymers or copolymers prepared from vinylaromatic hydrocarbons wherein the aromatic moiety can be either monocyclic or polycyclic. Typical monomers include styrene, alpha-methyl styrene, p-methyl styrene, vinyl xylene, ethyl vinyl xylene, vinyl naphthylene, and the like, or mixtures thereof. Assuming more than one block of vinylaromatic the blocks may be the same or different. They are preferably selected from styrene, alpha-methyl styrene, vinyl toluene, vinyl xylene, vinyl naphthylene, and especially styrene. The block of aliphatic diene may be derived from, for example, butadiene, isoprene, 1,3-pentadiene, 2,3-dimethylbutadiene, and the like, and it may have a linear, sequential or teleradial structure. As generally prepared, the aliphatic diene block of the polymer will have residual unsaturation present. Examples of such commercially available polymers are the KRO3 series available from Phillips, Stereon 840A available from Firestone and Kraton D available from Shell Chemical. For purposes of this invention, essentially all this residual unsaturation can undergo selective hydrogenation procedures whereby essentially all the unsaturation in the vinylaromatic block(s) is maintained. The selectively hydrogenated linear block copolymers are described in Haefel, et al., U.S. Pat. No. 3,333,024, which is incorporated herein by reference. These selectively hydrogenated copolymers are commercially available from Shell as the Kraton G series such as Kraton G1650, Kraton G1651 and Kraton G1652.

The copolymers can be random blocks, diblock, or triblock. An example of a commercially available random block is Stereon 840A, a copolymer of styrene and butadiene. An example of a diblock copolymer is Solprene, available from Phillips, a diblock of styrene and butadiene. Examples of triblock copolymer, such as styrene-butadiene-styrene are the Phillips KRO3 line and the Shell Kraton G and Kraton D lines, wherein the residual unsaturation of the aliphatic diene has been essentially removed by selective hydrogenation in the Kraton G series.

The ratio of the copolymers in the triblock copolymer and the average molecular weights can vary broadly in the triblock copolymer, although the molecular weight of the aliphatic diene block should be greater than that of the combined terminal blocks. It is preferred to form the terminal block each having a weight average molecular weight of about 2,000 to about 60,000 and center block, e.g. a hydrogenated or (non-hydrogenated polybutadiene) block, with a weight average molecular weight of about 20,000 to 450,000. Still more preferably, the terminal blocks each have a weight average molecular weight of about 7,000 to about 35,000 while the hydrogenated (or non-hydrogenated polybutadiene) polymer blocks have a weight average molecular weight between about 30,000 and 150,000. The terminal blocks will preferably comprise from about 10 to about 45% by weight, more preferably from about 14 to about 40% by weight of the total block copolymer. The preferred copolymers will be those having a polybutadiene center block wherein from about 35 to about 55% of the butadiene block segment is the structure resulting from 1,2 addition.

The hydrogenated copolymer will have the average aliphatic unsaturation reduced to less than 20% of the original value. It is preferred to have the unsaturation reduced to 10%, or less, preferably 5%, or less, of its original value. After hydrogenation center blocks derived from butadiene will have the ethylene butylene structure.

The block copolymers are formed by techniques well known to those skilled in the art. Hydrogenation may be conducted utilizing a variety of known hydrogenation catalysts such as nickel on kieselghur, Raney nickel, copper chromate, molybdenum sulfide and finely divided platinum or other noble metals on a high surface area carrier.

Hydrogenation may be conducted at any desired temperature or pressure, e.g., from atmospheric to about 210 Kg/Cm$^2$. The usual range being between 7 and 70 Kg/cm$^2$ at temperatures from 24° C. to 316° C. for times between 0.1 and 24 hours, preferably from 0.2 to 8 hours.

Hydrogenated block copolymers such as Kraton G-1650, Kraton G-1651 and Kraton G-1652 from Shell Chemical Company, Polymers Division, have been found useful in the present invention. Also useful are the Solprenes of Phillips.

The hydrogenated versions of radial teleblock copolymers of which the Solprenes are typical examples can be characterized as having at least three polymer branches with each branch of the radial block polymer comprising terminal non-elastomeric segments, as defined hereinafore. The branches of the radial block polymer contain a terminal non-elastomeric segment attached to an elastomeric polymer segment, as defined hereinafore. These are described in Marrs, U.S. Pat. No. 3,735,936 and in Zelinski, U.S. Pat. No. 3,281,383, both of which are incorporated herein by reference, and they are selectively hydrogenated by well known procedures. In any event, the term "selective hydrogenation" is used herein to contemplate polymers in which the aromatic blocks have been left essentially unhydrogenated.

The molecular weight of the triblock copolymer should be selected so that the tie layer will be easily processed together with the polycarbonate and the polyolefins. Kraton G-1652 is therefore preferred over Kraton G-1651, both available from Shell since the higher molecular weight of 1651 makes it more difficult to extrude.

A hydrogenated version of a diblock copolymer such as Stereon 840A or Kraton D 1720 can also be employed in the invention. Generally the vinylaromatic portion is from about 20 to 40 weight percent of the polymer, the remainder of the polymeric unit being the aliphatic diene. The random block copolymer such as Stereon 840A is made up of various unit blocks of varying length. Although referred to generally as a random block copolymer, Stereon 840A may be tapered as well, that is a block of styrene followed by a block of butadiene followed by a shorter block of styrene than the first block which is followed by a shorter block of butadiene than the first block followed by a still shorter block of styrene, etc. The quantity of vinylaromatic such as styrene is generally from about 20 to about 50 weight percent. In Stereon 840A, the weight percent of styrene is 43%.

After preparation of the hydrogenated block copolymer of the vinyl aromatic and aliphatic diene, the unsaturated dicarboxylic acid or acid anhydride is then grafted onto the hydrogenated block copolymer. No aliphatic double bond is needed to permit the grafting to occurr. Rather the grafting occurs on the saturated aliphatic portion. The techniques disclosed in European Patent application publication No. 173380 Gelles, et al, assigned to Shell Internationale Research Maatschappij B. B. and incorporated by reference, prepare the grafted block copolymer. Specifically the synthetic procedure as illustrated at 173380, page 6, line 23 and page 9, line 30 to page 13, line 31 are all incorporated by reference. This type of reaction will result in the addition of the unsaturated dicarboxylic acid or acid anhydride at a secondary or tertiary carbon atom of the block copolymer therefore resulting in the loss of the unsaturation in the grafting agent.

The grafting agent as previously mentioned is an unsaturated dicarboxylic acid or acid anhydride. Generally these acids or diacid anhydrides are of the group consisting of

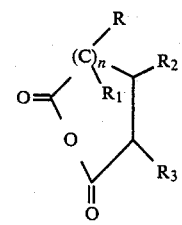

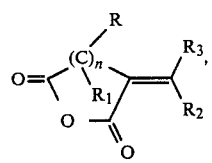

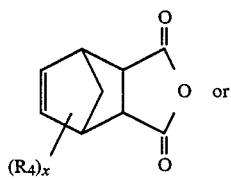

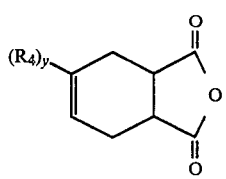

or the dicarboxylic acid analogues thereof wherein R is the same or different as $R_1$ and is alkyl of one to six carbon atoms, inclusive, or hydrogen;

$R_2$ and $R_3$ are the same or different and are hydrogen, alkyl of one to six carbon atoms, inclusive, phenyl, chloro or bromo; and n is 0, 1 or 2.

$R_4$ = H, alkyl of one to six carbon atoms, aryl, alkyl, phenyl, Br, Cl, X = 0 to 7, preferably 0, 1 or 2, y = 0 to 6.

The preferred alkyl groups have no more than three carbon atoms. R and $R^1$ are each preferably hydrogen and n is preferably zero or 1, x and y are preferably 0 or 1. Examples of the acid anhydrides and the diacid analogue thereof are maleic anhydride, itaconic anhydride, methyl maleic anhydride, monochloro maleic anhydride, dichloro maleic anhydride, dimethyl maleic anhydride, norbornene dicarboxylic anhydride, tetrahydrophthalic anhydride.

The composition blends can be prepared by the usual methods of dry mixing or can be prepared by re-extrusion prepared by re-extrusion of scraps of multilayer compositions prepared from the above components, see U.S. Ser. No. 075,716, filed July 20, 1987. As aforestated the composition blends have significant advantages over the same compositions wherein a nongraft modified block copolymer of a hydrogenated alkylidene and vinyl aromatic copolymer is employed. Although not to be bound by the theory of the invention, it is possible that an admixture of the components is not the only moiety present in the final composition. It is believed that the graft modified block copolymer may interact in a covalent manner with one or more of the other components of the blend. Therefore when the term admixture is employed, it can possibly include not only physically discrete components blended together but also new entities made through the covalent linkages of the grafted block copolymer with other components of the composition.

Below are control examples and examples of the invention. These examples are used to illustrate the invention rather than narrowing the broad inventive concept present.

EXAMPLES

In the Examples below the separate components were admixed together in a Henschel mixer and then extruded at 250° C. temperature in a Werner and Pfleiderer 30 mm extruder. Parts were molded at 250° C. temperature. The polycarbonate, PC, used was a bisphenol-A polycarbonate with an intrinsic viscosity at 25° C. in methylene chloride of 0.53–0.55 dl per g.

The polypropylene, PP, employed is Shell 5550 with a melt flow index of 5.0 g/10 min. The ethylene vinyl alcohol, EVOH, is obtained from Kuraray Co. and is "EVAL F" with a melt flow index of 1.5 g/10 min. The hydrogenated alkydiene vinyl aromatic block copolymer is styrene/ethylene butylene/styrene, SEBS, is obtained from Shell as Kraton G 1651. The grafted copolymer SEBSgMA is obtained from Shell as Kraton G 1651 which is grafted with 0.25% maleic anhydride prepared according to the method described. The tensile strength and elongation were measured according to ASTM D638. The Notched Izod was measured according to ASTM D256.

Below are the results:

TABLE I

| COMPONENTS | 1 | A | 2 | B | 3 | C | 4 | D |
|---|---|---|---|---|---|---|---|---|
| PC | 60 | 60 | 55 | 55 | 30 | 30 | 25 | 25 |
| PP | 30 | 30 | 25 | 25 | 60 | 60 | 55 | 55 |
| EVOH | 5 | 5 | 10 | 10 | 5 | 5 | 10 | 10 |
| SEBS | — | 5 | — | 10 | — | 5 | — | 10 |
| SEBSgMA | 5 | — | 10 | — | 5 | — | 10 | — |
| Tensile Str. @ Yield, Kpsi | 6.0 | 5.9 | 5.0 | 5.6 | 4.7 | 4.8 | 4.3 | 4.5 |
| Elong. %* | 12 | 6 | 13 | 5 | 10 | 6 | 19 | 5 |
| Notched Izod ft-lbs/in | 1.4 | 1.1 | 3.1 | 1.0 | 0.7 | 0.6 | 1.9 | 0.8 |

*Samples with ≦6% elongation show no yielding before failure. Samples with ≧10% elongation show yielding before the sample broke.

As is clearly shown by the data, the percent elongation is increased substantially when the grafted block copolymer is used instead of a non-grafted SEBS copolymer in the same compositions other than the change from non-grafted to grafted. Notched Izod impact strength is also improved with higher polycarbonate weight percents.

What is claimed is:

1. A composition which comprises an admixture of
   a. an aromatic polycarbonate,
   b. a polyolefin,
   c. an ethylene vinyl alcohol copolymer,
   d. a hydrogenated alkylidene vinyl aromatic block copolymer graft modified with an unsaturated dicarboxylic acid or unsaturated dicarboxylic acid anhydride.

2. The composition in accordance with claim 1 as measured by the quantities of a, b, c and d;
   a is from about 20 to 80 weight percent,
   b is from about 20 to 80 weight percent,
   c is from about 3 to 15 weight percent,
   d is from about 3 to 15 weight percent.

3. The composition in accordance with claim 2 wherein a is bisphenol-A polycarbonate.

4. The process in accordance with claim 2 wherein b is polypropylene.

5. The composition in accordance with claim 2 wherein c is from about 10 to 60 weight percent ethylene.

6. The composition in accordance with claim 2 wherein in d alkylidene is butadiene and vinyl aromatic is styrene.

7. The composition in accordance with claim 2 wherein the graft is maleic anhydride or fumaric acid.

8. The composition in accordance with claim 6 wherein the graft is maleic anhydride or fumaric acid.

9. A composition formed from the process of mixing a melt of an aromatic polycarboante with a melt of a polyolefin with a melt of an ethylene vinyl alcohol copolymer with a melt of a hydrogenated alkadiene vinyl aromatic block copolymer graft modified with an unsaturated dicarboxylic acid or unsaturated dicarboxylic acid anhydride.

* * * * *